J. LAMB.
Thill Coupling.
No. 77,626. Patented May 5, 1868.
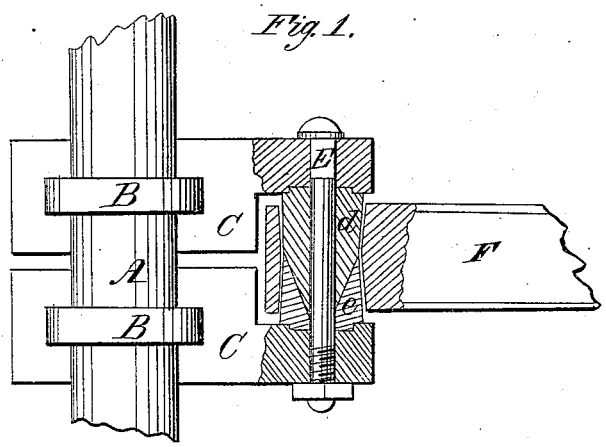
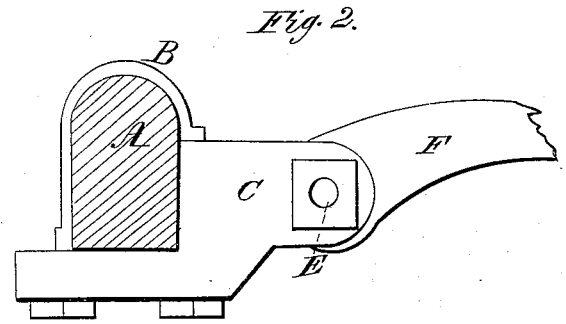

United States Patent Office.

JAMES LAMB, OF AURORA, INDIANA.

*Letters Patent No. 77,626, dated May 5, 1868.*

IMPROVEMENT IN SHAFT-COUPLING.

*The Schedule referred to in these Letters Patent and making part of the same.*

TO ALL WHOM IT MAY CONCERN:

Be it known that I, JAMES LAMB, of Aurora, in the county of Dearborn, and in the State of Indiana, have invented certain new and useful Improvements in Shaft-Couplings; and do hereby declare that the following is a full, clear, and exact description thereof, reference being had to the accompanying drawings, and the letters of reference marked thereon.

In the annexed drawings, making a part of this specification, A represents the front axle of any vehicle, and B B ordinary clips, and which secure or fasten the jaws C C to the axle A.

C C represent jaws made of malleable metal, and secured to the axle A by means of clips B B. Each of the jaws C C is provided with a tapering hook, at right angles with the sides thereof, represented and marked in the drawings by $d$ and $e$. One of the hooks is provided with a conical point, and the other with a recess or cavity corresponding therewith.

F represents a shaft-iron, made in any suitable form and dimensions, and is coupled or secured by means of the hooks $d$ and $e$, which are inserted in opposite sides thereof. The hole in the shaft-iron F is made just large enough, and tapering toward the middle, to fairly admit the ends of the hooks $d$ and $e$, (the hook $d$ beyond its conical bevel.) The hooks $d$ and $e$ are held in the shaft-iron F by means of a bolt, E, which passes through their centres. The hole in the shaft-iron, and the hooks $d$ and $e$ tapering slightly, to correspond with each other, they fit closely and prevent all rattling and noise by the shaft-iron and its coupling. As the hole of the shaft-iron and the hooks wear away, all that is necessary to keep them tight is to occasionally screw up the bolt E, and the taper of the hooks will fill the enlarged hole and keep the whole coupling from rattling until the same is completely worn up to the side of the jaws C C.

Having thus fully described my invention, what I claim as new, and desire to secure by Letters Patent, is—

The movable taper $d$ and movable socket $e$, secured between the arms C C, and used in combination with the straight bolt E, thill F, and clips B B, substantially as set forth.

In testimony that I claim the foregoing, I have hereunto set my hand, this 10th day of January, 1868.

JAMES LAMB.

Witnesses:
  JNO. A. CONWELL,
  FREDERICK ERLE.